US 8,498,785 B2

(12) United States Patent
Juzswik et al.

(10) Patent No.: US 8,498,785 B2
(45) Date of Patent: Jul. 30, 2013

(54) METHOD AND APPARATUS FOR DETERMINING TIRE POSITION ON A VEHICLE

(75) Inventors: David L. Juzswik, Commerce Township, MI (US); Dan Rasmussen, Flint, MI (US)

(73) Assignee: TRW Automotive U.S. LLC, Livonia, MI (US)

( * ) Notice: Subject to any disclaimer, the term of this patent is extended or adjusted under 35 U.S.C. 154(b) by 482 days.

(21) Appl. No.: 12/876,756

(22) Filed: Sep. 7, 2010

(65) Prior Publication Data

US 2012/0059551 A1 Mar. 8, 2012

(51) Int. Cl.
  *G05D 1/00* (2006.01)
  *G06F 7/00* (2006.01)
  *G06F 17/00* (2006.01)

(52) U.S. Cl.
  USPC .......... 701/49; 701/31.1; 701/29.1; 701/30.9; 701/498

(58) Field of Classification Search
  USPC ............... 340/442, 426.33, 686.1, 815.64
  See application file for complete search history.

(56) References Cited

U.S. PATENT DOCUMENTS

| | | | | |
|---|---|---|---|---|
| 5,526,263 | A * | 6/1996 | Tanaka et al. | 701/70 |
| 5,739,431 | A * | 4/1998 | Petri | 73/509 |
| 6,204,758 | B1 * | 3/2001 | Wacker et al. | 340/444 |
| 6,259,361 | B1 * | 7/2001 | Robillard et al. | 340/447 |
| 6,384,720 | B1 * | 5/2002 | Juzswik et al. | 340/442 |
| 7,010,968 | B2 * | 3/2006 | Stewart et al. | 73/146 |
| 7,362,218 | B2 * | 4/2008 | McCall et al. | 340/447 |

(Continued)

FOREIGN PATENT DOCUMENTS

| | | |
|---|---|---|
| JP | 2006205906 | 8/2006 |
| KR | 20070005518 | 1/2007 |

OTHER PUBLICATIONS

U.S. Bortolin U.S. Appl. No. 12/404,591, filed Mar. 16, 2009 entitled "Method and Apparatus for Determining Tire Position on a Vehicle".

*Primary Examiner* — Khoi Tran
*Assistant Examiner* — Jorge Peche
(74) *Attorney, Agent, or Firm* — Tarolli, Sundheim, Covell & Tummino LLP

(57) ABSTRACT

An apparatus determines a position of a tire on a vehicle including a tire-based sensing unit, each tire on the vehicle having an associated tire-based sensing unit. Each tire-based sensing unit includes a first sensor mounted for rotation with the tire and for generating a first sensor signal indicative of such rotation, a second sensor mounted for rotation with the tire and for generating a second sensor signal indicative of such rotation, and a transmitter for transmitting a signal indicative of a phase relationship between the first and second sensor signals. An axle position sensor is provided for determining each tire-based sensing unit position relative to a front and rear axle of the vehicle and provides an axle position signal for each tire-based sensing unit. A controller monitors the transmitted phase signals of each tire-based sensing unit and the determines axle position signals. The controller compares the tire-based sensing unit phase relationships for possible tire locations considering the determined axle positions of the tire-based sensing units, determines a confidence value by weighting the compared phase relationships, compares the phase difference of each tire-based sensing unit relative to the phase difference of other tire-based sensing units for each possible vehicle tire location, and associates each tire-based sensing unit with a vehicle location in response to the confidence values.

9 Claims, 8 Drawing Sheets

U.S. PATENT DOCUMENTS

| | | | |
|---|---|---|---|
| 7,367,227 B2* | 5/2008 | Stewart et al. | 73/146 |
| 7,392,119 B2* | 6/2008 | Allard et al. | 701/33.9 |
| 7,423,532 B2* | 9/2008 | Stewart et al. | 340/572.1 |
| 7,646,195 B2* | 1/2010 | Salfelner | 324/244 |
| 2002/0047715 A1* | 4/2002 | Holm | 324/683 |
| 2003/0128108 A1* | 7/2003 | Knapp | 340/442 |
| 2003/0145650 A1* | 8/2003 | Juzswik et al. | 73/146 |
| 2003/0197603 A1* | 10/2003 | Stewart et al. | 340/442 |
| 2004/0196149 A1* | 10/2004 | Dufournier | 340/443 |
| 2005/0156722 A1* | 7/2005 | McCall et al. | 340/447 |
| 2005/0179530 A1* | 8/2005 | Stewart et al. | 340/447 |
| 2006/0044125 A1* | 3/2006 | Pierbon | 340/442 |
| 2006/0142911 A1* | 6/2006 | Allard et al. | 701/29 |
| 2006/0220805 A1* | 10/2006 | Thomas et al. | 340/426.33 |
| 2008/0030314 A1* | 2/2008 | Watabe | 340/447 |
| 2008/0246467 A1* | 10/2008 | Vial et al. | 324/207.25 |
| 2008/0284577 A1* | 11/2008 | Juzswik et al. | 340/447 |
| 2009/0179747 A1* | 7/2009 | Lin et al. | 340/442 |
| 2009/0204361 A1* | 8/2009 | Watasue | 702/141 |
| 2009/0210111 A1* | 8/2009 | Laermer et al. | 701/30 |
| 2010/0231403 A1* | 9/2010 | Bortolin | 340/686.1 |

* cited by examiner

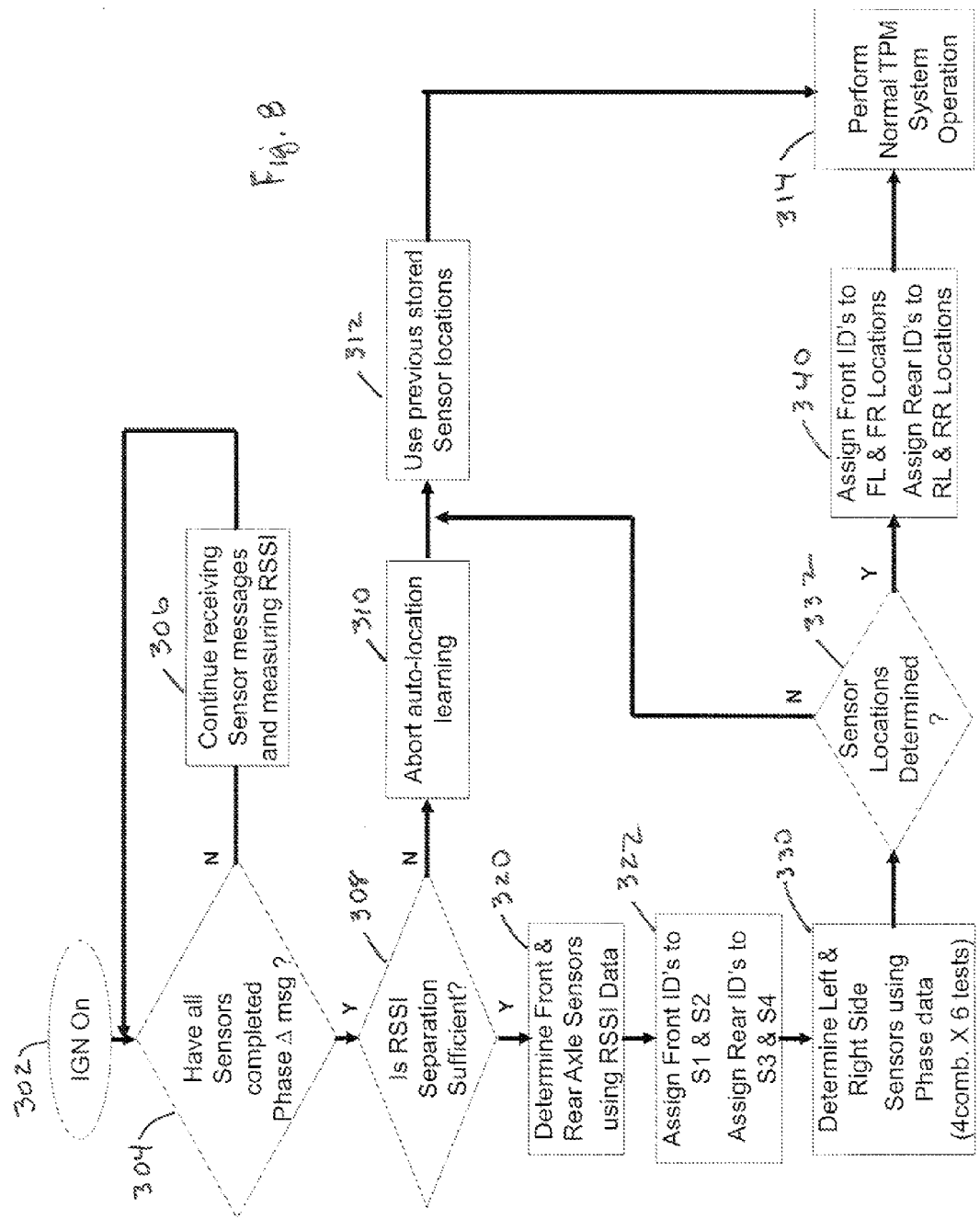

METHOD AND APPARATUS FOR DETERMINING TIRE POSITION ON A VEHICLE

TECHNICAL FIELD

The present invention relates to a method and apparatus for determining a position of a tire on a vehicle and, in particular, a method and apparatus for determining a position of a tire on a vehicle for use in a tire pressure monitor system.

BACKGROUND

Systems for sensing tire conditions and displaying sensed tire condition information to a vehicle occupant are known. Often, such systems are known as tire pressure monitoring systems even though the system may not only sense tire pressure but may also sense other tire conditions such as tire temperature. Such tire pressure monitor systems include a tire-based sensor assembly that senses both the pressure and temperature inside its associated tire and transmits the sensed pressure and temperature information to a vehicle-based receiver, i.e., a receiver mounted in the vehicle. The transmitted sensed tire condition signal may be a coded radio frequency ("RF") signal. The vehicle-based receiver is connected to a display located in the vehicle cabin to display, for example, a warning signal to the vehicle operator when an under-inflated tire pressure condition exists or an over-heated tire condition occurs.

Each tire-based sensor assembly may have a unique identification code associate therewith. The tire-based sensor assembly transmits a signal that includes the unique identification code and the sensed tire condition. The vehicle-based receiver must associate the received signal from the tire-based sensor assembly, and, in particular, the unique tire identification code, with a particular tire position location on the vehicle so as to display the sensed tire condition information appropriately to the vehicle operator, i.e., display tire pressure/temperature condition and location information so the vehicle operator can identify which tire has a sensed, improper condition.

Associating tire location with tire transmitter unique codes requires a learning process by the vehicle-based receiver. Many processes have been proposed to accomplish this learning function including signal interrogation methods in which each tire-based sensor assembly is separately interrogated. In response to receiving an interrogation signal, the tire-based sensor assembly transmits a response signal having its unique identification information. Upon receipt of the response signal, the vehicle-based receiver associates that unique tire identification code with that tire location since the system "knows" which tire location was just interrogated. The vehicle-based system stores identification codes and tire location correlations in memory for use in its display operation.

U.S. Patent Application Publication US 2006/0142911 of Allard et al. discloses a method and apparatus for locating the position of a wheel on the right or left of a vehicle using signals from two magnetic sensors. U.S. Patent Application Publication US 2006/0044125 of Pierbon discloses a method and apparatus for detecting the right/left position of a wheel on a vehicle using acceleration signals from first and second means capable of measuring acceleration, such as shock sensors incorporating elements made of piezoelectric ceramic. U.S. Patent Application Publication US 2009/0204361 of Watasue discloses a tire rotation detection system and method using an accelerometer and accounting for acceleration due to earth's gravity.

SUMMARY OF THE INVENTION

The present invention is directed to a method and apparatus for determining a position of a tire on a vehicle.

In accordance with an example embodiment of the present invention, an apparatus determines a position of a tire on a vehicle including a tire-based sensing unit, each tire on the vehicle having an associated tire-based sensing unit. Each tire-based sensing unit includes a first sensor mounted for rotation with the tire and for generating a first sensor signal indicative of such rotation, a second sensor mounted for rotation with the tire and for generating a second sensor signal indicative of such rotation, and a transmitter for transmitting a signal indicative of a phase relationship between the first and second sensor signals. An axle position sensor is provided for determining each tire-based sensing unit position relative to a front and rear axle of the vehicle and provides an axle position signal for each tire-based sensing unit. A controller monitors the transmitted phase signals of each tire-based sensing unit and the determines axle position signals. The controller compares the tire-based sensing unit phase relationships for possible tire locations considering the determined axle positions of the tire-based sensing units, determines a confidence value by weighting the compared phase relationships, compares the phase difference of each tire-based sensing unit relative to the phase difference of other tire-based sensing units for each possible vehicle tire location, and associates each tire-based sensing unit with a vehicle location in response to the confidence values.

In accordance with another example embodiment of the present invention, a method for determining a position of a tire on a vehicle comprises the steps of sensing tire rotation by a first method and generating a first signal indicative of sensed rotation, sensing tire rotation by a second method and generating a second signal indicative of sensed rotation, transmitting a signal indicative of a phase relationship between the first and second signals, measuring signal strength of the transmitted sensor signals, and monitoring the phase relationship of the transmitted signals, determining confidence value weights from the monitored phase relationships, monitoring the received signal strength of the transmitted signals, and correlating location of each tire-based sensing unit with vehicle location responsive to the confidence values

BRIEF DESCRIPTION OF THE DRAWINGS

The foregoing and other features and advantages of the present invention will become apparent to one skilled in the art upon consideration of the following detailed description of the invention along with the accompanying drawings, in which:

FIG. 8 is a flow chart depicting a control process used by the vehicle-based receiver in accordance with an example embodiment of the present invention.

DETAILED DESCRIPTION

Figure 1:
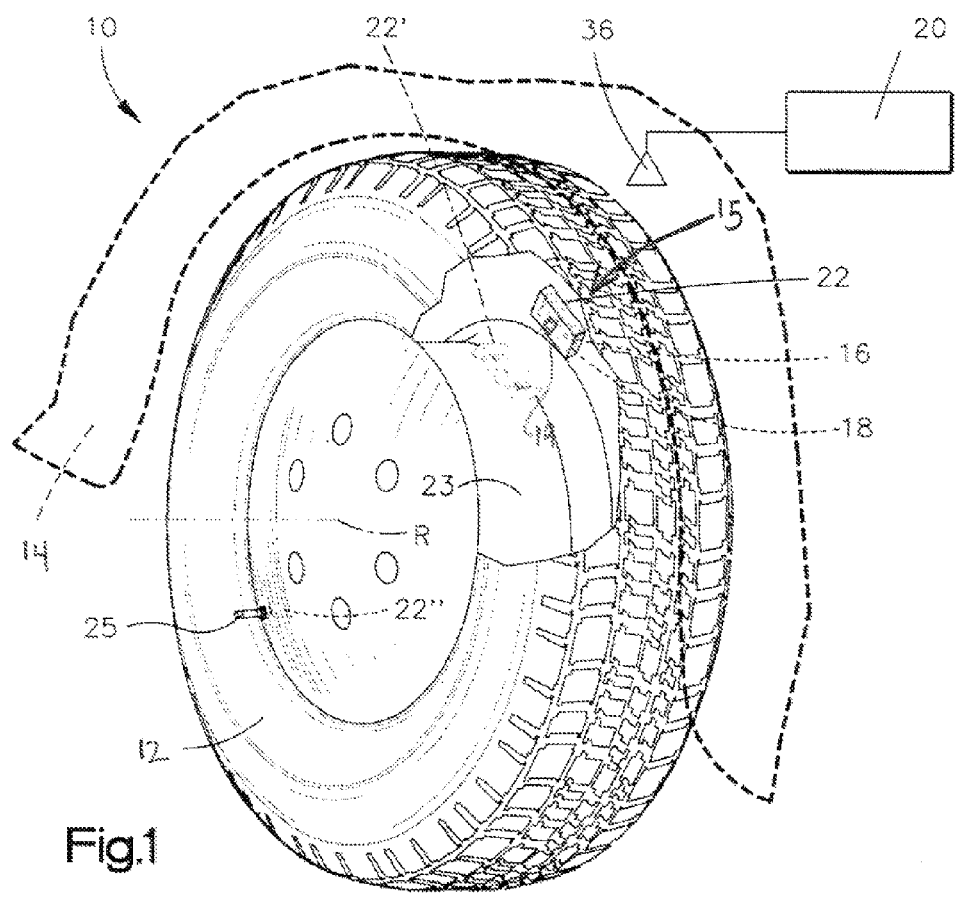
FIG. 1 is a schematic view of a vehicle tire having a tire-based sensor unit in accordance with an example embodiment of the present invention.

Referring to FIG. 1, an apparatus 10, made in accordance with an example embodiment of the present invention, is used for determining the position of a tire 12 on a vehicle 14. The apparatus 10 includes a tire-based sensor assembly 15 having an accelerometer 16 and a magnetic sensor 18 mounted within a housing 22. The housing 22 is located on the inside of the cavity defined by the vehicle tire 12. The tire-based sensor assembly 15 further includes sensor(s) 19 for sensing tire conditions such as pressure and/or temperature.

The housing 22 could be fixed to an interior side-wall portion of the tire 12, or could be attached to the wheel 23 (shown as 22') to which the tire 12 is mounted, or could be attached to a valve stem 25 (shown as 22"). A vehicle-based unit 20 having an antenna 36 is mounted to the vehicle such as within the cabin of the vehicle for receiving transmitted electrical signals, e.g., radio frequency ("RF"), from the sensor assembly 15. The tire-based sensor assembly 15 may include a transmitter for transmitting signals indicative of sensed parameters or may include a transceiver for transmitting RF signals to the vehicle-based unit indicative of sensed parameters and for receiving signals from the vehicle-based unit 20 such as RF or low frequency ("LF") signals.

Figure 2:
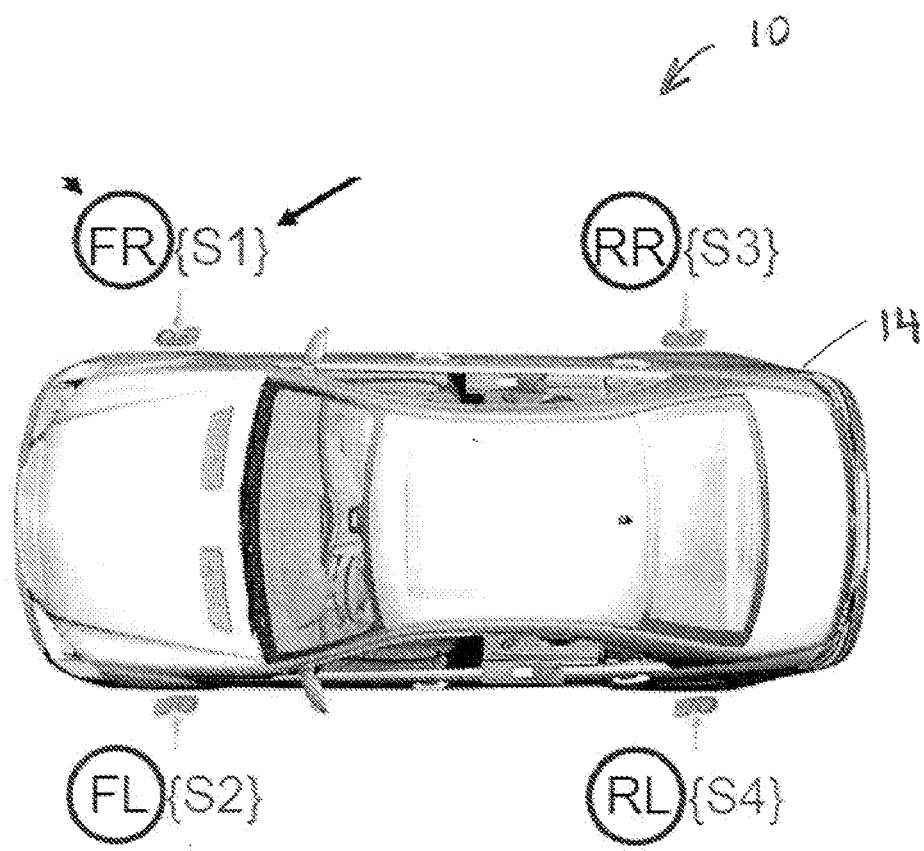
FIG. 2 is a schematic illustration of a vehicle depicting tire and sensor locations.

Referring to FIG. 2, the vehicle 12 has four tires located at associated corners of the vehicle. For the purposes of explanation, the four corners of the vehicle 14 are designated as front right ("FR"), front left ("FL"), rear right ("RR"), and rear left ("RL"). The tire-based sensor assemblies 15 for each of the vehicle's corners are identified as S1, S2, S3, and S4. In the present description of the example embodiment, sensor S1 is located at the FR location, sensor S2 is located at the FL location, sensor S3 is located at the RR location, and sensor S4 is located at the RL location. However, when the system operation first begins, the vehicle-based unit 20 does not "know" where the sensors S1, S2, S3, and S4 are located. In accordance with the present invention, the sensor locations are determined using the accelerometer sensor information, earth's magnetic field sensor information, and Received Signal Strength Information to associate and correlate each sensor and tire location.

Figure 3:
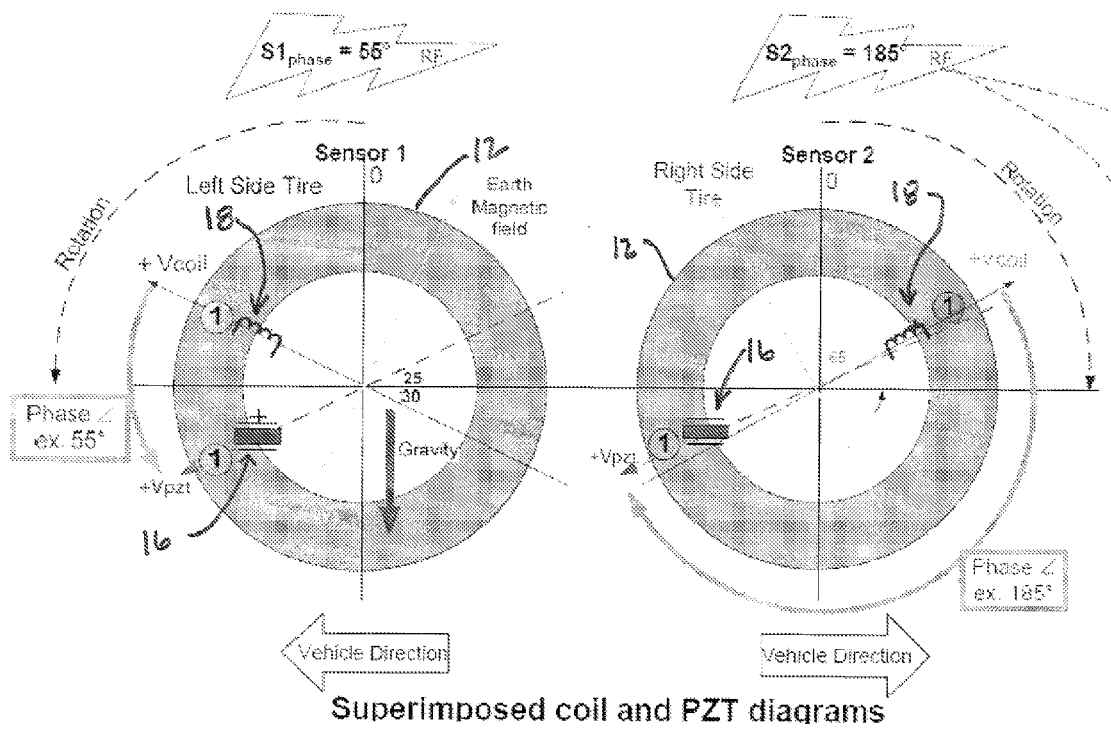
FIG. 3 is a schematic illustration of vehicle tires showing superimposed sensor diagrams for the tire-based sensor of the present invention.

Referring to FIG. 3, the accelerometer 16 may be a piezoelectric transducer ("PZT") that generates a voltage that changes with force as the tire rotates. Two forces that the accelerometer experiences during tire rotation is centripetal force and earth's gravitational force. As the accelerometer 16 travels in a circle during one tire rotation, it will see the earth's gravitation force change from +1 G to −1 G and is in a sinusoidal pattern over one rotation of the tire. The centripetal force will either be of a consistent level when the vehicle is traveling at a constant velocity, or will be slowly changing with vehicle speed, in comparison to the change in the earth's force during rotation. Tires on opposite sides of the vehicle naturally rotate in opposite directions during movement of the vehicle. This would cause the two PZT signals to be 180 degrees different from each other, with respect to a common fixed reference (ex, vertical from earth surface). In the example embodiment of the present invention, the PZT axis of sensitivity (peak voltage) is inclined 25 degrees from the mounted surface of a printed circuit board on which the sensor is mounted. This has the effect of reducing the right-side vs. left-side PZT phase relationship from 180 degree to 130 degree (180-25-25). To establish a reference point for comparison of the accelerometer signals to determine left-side versus right-side of the vehicle, the earth's magnetic field sensor 18 is used.

The earth's magnetic field sensor 18 is mounted also within the housing 22 so as to rotate with the tire 12. As the tire 12 and earth's magnetic field sensor 18 are rotating with vehicle movement, the coil portion of the earth's magnetic field sensor 18 is moving through the earth's magnetic field. As is well know, when a coil moves through a magnetic field, an electrical signal is induced across the coil. The output signal from the earth's magnetic field sensor 18, as the sensor moves through the earth's magnetic field during tire rotation, is a sinusoidal signal. The peak of the sinusoidal signal from the magnetic sensor 18 is shifted by 90 degrees relative to the peak of the magnetic field. The angle of the earth's magnetic field does change geographically, e.g., a 90 degree inclination at the earth's poles and 0 degrees at the earth's equator. At any magnetic inclination angle and the same tire angle, the left and right signals are aligned and can therefore be used as a reference value. It has been discovered that a phase comparison between the output signal of the magnetic sensor 18 (used as a reference point) and the output signal of the accelerometer signal (sensing the earth's gravitational field) provides an indication of the sensor assembly being on the right side or left side of the vehicle. In accordance with the present invention, multiple measurements are made and averaged to obtain suitable data correlation between the magnetic sensor information and the accelerometer information so as to accurately determine if the tire is on the left or right side of the vehicle. The relative phase information between the two sensors is measured at the signal peaks and the vehicle-based unit 20 determines clockwise vs. counter-clockwise rotation so as to determine left side or right side of the vehicle. A six phase confidence test is used by the vehicle-based unit 20 to correlate sensor/vehicle location.

Figure 4:
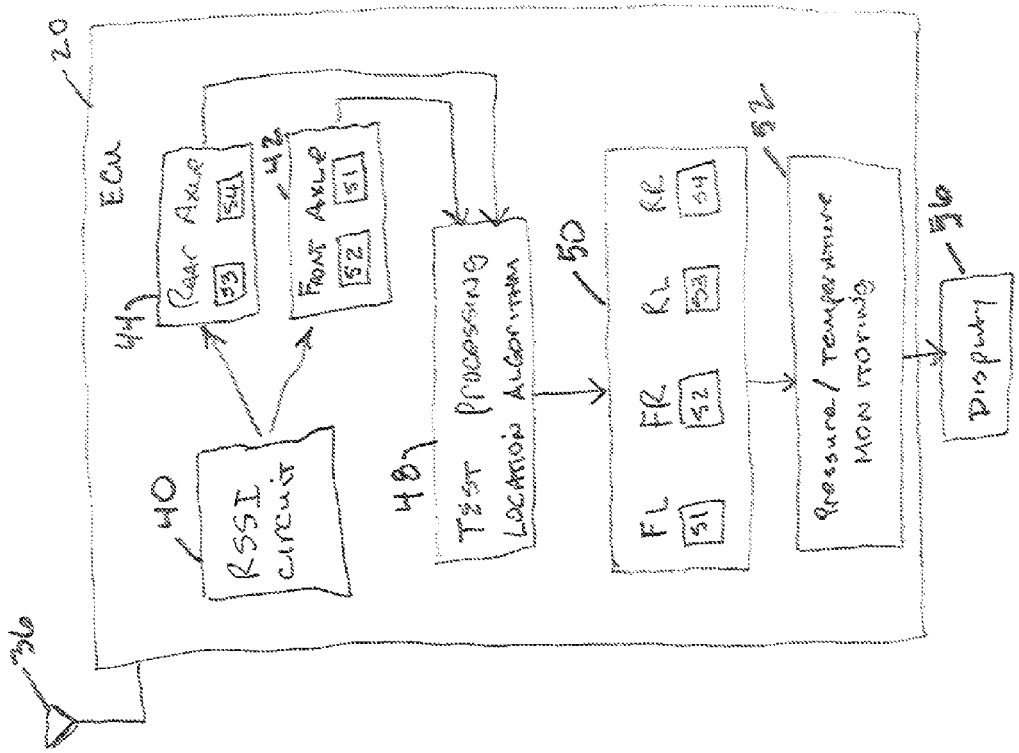
FIG. 4 is a schematic block diagram of the vehicle-based receiver in accordance with an example embodiment of the present invention.

Referring to FIG. 4, the vehicle-based unit 20 includes a controller such as a microcontroller. Those skilled in the art will appreciate that the control functions of the vehicle-based unit could be accomplished using discrete circuitry or an application specific integrated circuit ("ASIC"). To correlate sensor location with vehicle tire location, not only must left and right side be determined, but also front and rear location must be determined. To determine if the tires are located on the front or rear of the vehicle, the controller monitors the signal strength of tire sensor transmissions using receive signal strength indication ("RSSI") circuitry and locates its associated receiving antenna 36 at a location so that the distance between front and rear axles (front and rear tire positions) is different. The controller of the vehicle-based unit 20 processes the phase difference information and the RSSI information, and, using analysis in accordance with the present invention, provides an accurate determination of the location of a tire-based sensor that is transmitting a tire condition information signal. Using the determined sensor location information, the controller 20 sends the tire condition and location information to an appropriate display 56 within the vehicle cabin for the vehicle operator.

The controller 20 receives phase information signals from each of the tire-based monitors via its antenna 36. As mentioned, the antenna 36 is located an unequal distance from the front and rear axles of the vehicle. The controller 20 includes a RSSI evaluation circuit 40 that, based on signal strength, determines if a received signal is from one of the sensor modules associated with the tires on the front axle 42 of the vehicle or is from one of the sensor modules associated with the tires on the rear axle 44 of the vehicle. The controller, monitoring all transmitted signals from the sensors S1, S2, S3, and S4, applies a confidence test process location algorithm 48 that correlates or associates 50 each particular sensor S1, S2, S3 or S4 with an associated tire location F1, FR, RL, or RR on the vehicle. The pressure/temperature information portion of the transmitted signal is monitored 52 for each of the sensors, and the tire condition information can be displayed along with the associated determined tire location information for the vehicle operator. As those skilled in the art will appreciate, the display of tire condition information can be limited only to abnormal tire conditions or can be continuous tire pressure and temperature information if so desired.

Also, the signals from the tire-based sensors 16, 18 can be used to control the rate and timing of transmitted information. A sinusoidal output signal from either of the sensors 16, 18 indicate that the vehicle is moving. A flat signal or no signal from the sensors 16, 18 is indicative of no vehicle movement. The vehicle-based unit 15 may also have a controller, such as a microcontroller, for monitoring the output signals from the sensors 16, 18 and for controlling transmission of the phase and tire condition information and for controlling transmission rates. The controller of the tire-based unit 15 may, for example, monitor the outputs of the sensors 16, 18 every three seconds to determine if there is vehicle movement or not. If motion is detected, the controller of the tire-based unit then measures the phase difference between the earth's magnetic field signal from sensor 18 and the accelerometer output from sensor 16. Several measurements could be taken and then averaged. Once a phase difference value is determined, it is transmitted along with sensed tire condition information. The rate of data transmission during vehicle motion can be predetermined. The rates of date transmission indicative of vehicle motion and tire condition can be different or can be the same. If no vehicle motion is sensed, no data transmission is made. Also, the rate of pressure measurements and the rate of motion measurements can be different or the same and can depend on whether there is sensed vehicle motion or not.

Figure 5:
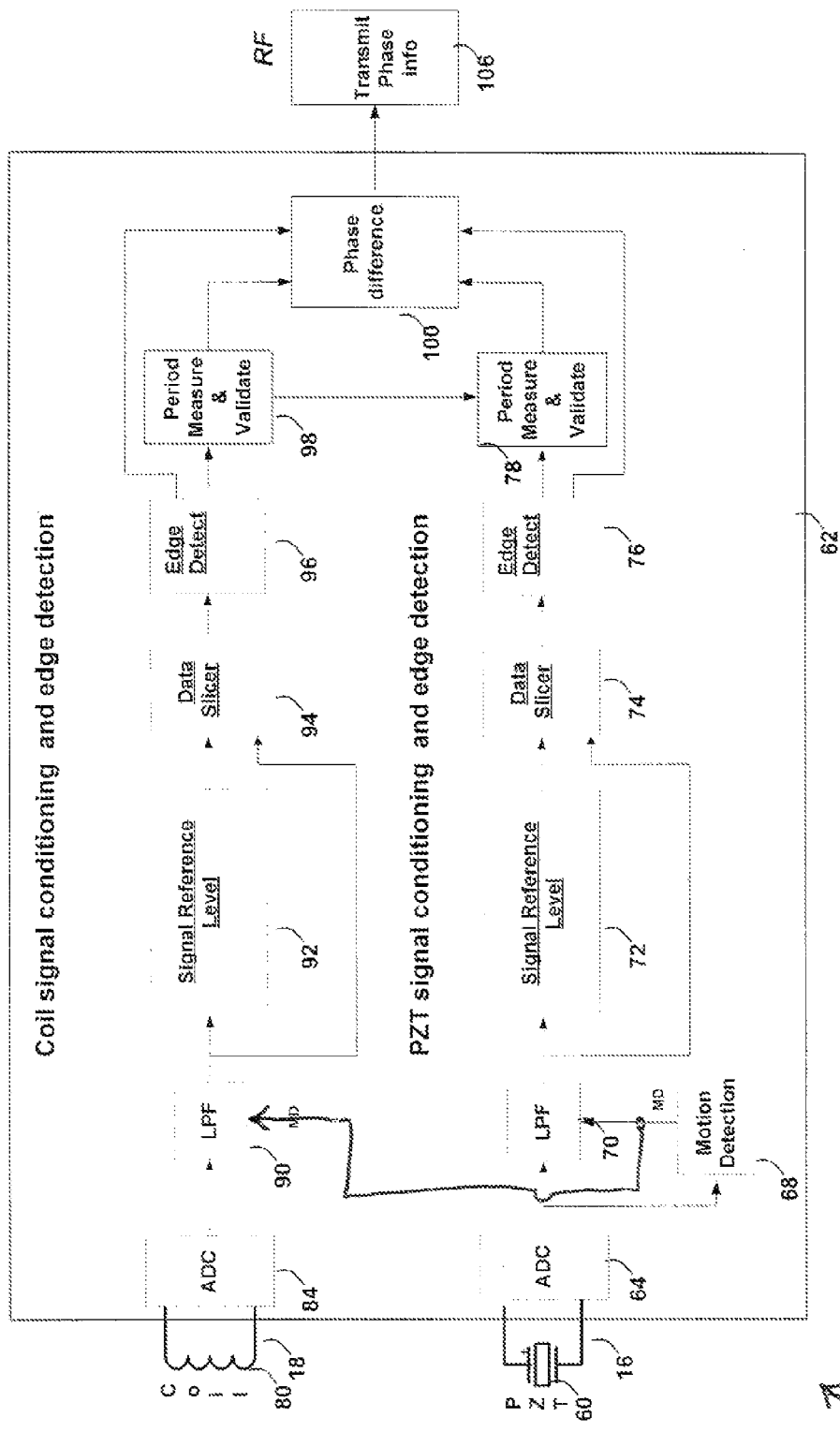
FIGS. 5 is a schematic block diagram of the tire-based sensor unit in accordance with an example embodiment of the present invention.

Referring to FIG. 5, the operation of the tire-based sensor units 15 will be better appreciated. Each of the tire-based units 15 are constructed and operate in a similar manner. As mention, in accordance with the present invention, the phase difference between the earth's magnetic sensor signal and the accelerometer signal (providing a signal due to rotation of the accelerometer through the earth's gravitational field) is determined. To make this phase difference determination, the signals from the two sensors are sampled via a Analog-to-Digital Converter, filtered, and converted to a digital signal such that the phase difference can be determined from the edges of the digital signals. Specifically, the accelerometer sensor 16 includes an accelerometer 60 such as a piezoelectric sensor. The signal processing circuitry 62 can take any of several forms such as discrete circuitry, a microcontroller, or an ASIC, and can be embodied in either in the analog or digital domain. The describe example embodiment uses the digital domain.

The output of the accelerometer is connected to a signal amplification and Analog-to-Digital Converter ("ADC") 64. The signal processor circuit 62 controls how often the ADC 64 is sampled. It should be appreciated that the sampling rate will be dependent of the rotation rate. In general, the sampling rate controlled by signal processor circuit 62 should be at least 10 times the tire 12 rotation rate. The sampled acceleration signal is then connected to a motion detection circuit 68 and to a software low pass filter 70. The low pass filter 70 aids in removing road noise from the accelerometer signal. The signal processing circuit uses the motion detection result for control of sensing and transmission rate. Motion detection 68 can be implemented either by sensing the amount of change (due to rotating about earth's gravitational force), or a discrete level (centripetal force), depending on the type of accelerometer utilized. For the case of an PZT based accelerometer, motion detection is based on amount of signal change. Unless motion is detected by 68, LPF 70, and successive circuits, are not enabled. From the LPF 70 and using standard signal processing techniques, a reference signal level 72 is determined. Typical implementation for the reference signal level determines an average by using a low pass filter that is much lower than the rotation rate. Other techniques such as adaptive filters can also be utilized, depending on the nature of the signal. The low passed filtered acceleration signal is then compared signal reference level 72 in the data slicer 74. The data slicer 74 converts the analog signal into a digital signal (0 or 1). Edge detector circuit 76 enables Period Measure circuit 78 to determine the period of the acceleration signal. It also establishes a clock reference to be used for phase difference determination. Circuit 78 will also determine the validity of the period it determines, based on the speed capability of the vehicle.

The earth's magnetic field sensor 18 includes a sensing coil 80. The sensing coil 80 is connected to the signal processor circuit 62 and more specifically to signal conditioning and ADC 84, which is controlled by signal processor circuit 62 in a similar manner described with regard to PZT 16. The sampled signal is connected from ADC 84 to low pass filter 90, which is enabled by motion detection circuit 68. A signal reference level 92 is then determined form LPF 70 and the reference level 92 is compared to the LPF signal 90 in the Data slicer 94. The data slicer 94 makes a digital signal from the digitized analog signal, and is fed to edge detection 96 which enables Period measure 98 to determine the period and also establishes a clock reference to be used for phase difference comparison. Circuit 98 will also determine the validity of the period it determines, A phase difference circuit 100 compares period information 78 and 98 for similarity, and will use edge detection clock references 76 and 96 and period information 98 to determine the phase difference between the sensed earth's magnetic field and the accelerometer signal indicating rotation through the earth's gravitational field. The phase difference circuit 100 uses the earth's magnetic field as a zero point reference and determines the accelerometer phase difference relative to this reference. This determined phase difference is transmitted to the vehicle-based receiver unit 20 via a radio frequency ("RF") transmitter 106. As mentioned, the tire-based unit 15 could include a tire pressure sensor and/or temperature sensor for sensing tire condition. As part of the RF signal transmitted signal from the transmitter 106 could include, not only the determined phase difference information, but also the tire condition information. The vehicle-based unit 20 uses the sensed phase information from the tire-based units at the four tire locations and received signal strength information in one or more location determination algorithms to correlate each sensor location with the associated vehicle tire location.

Figure 6:
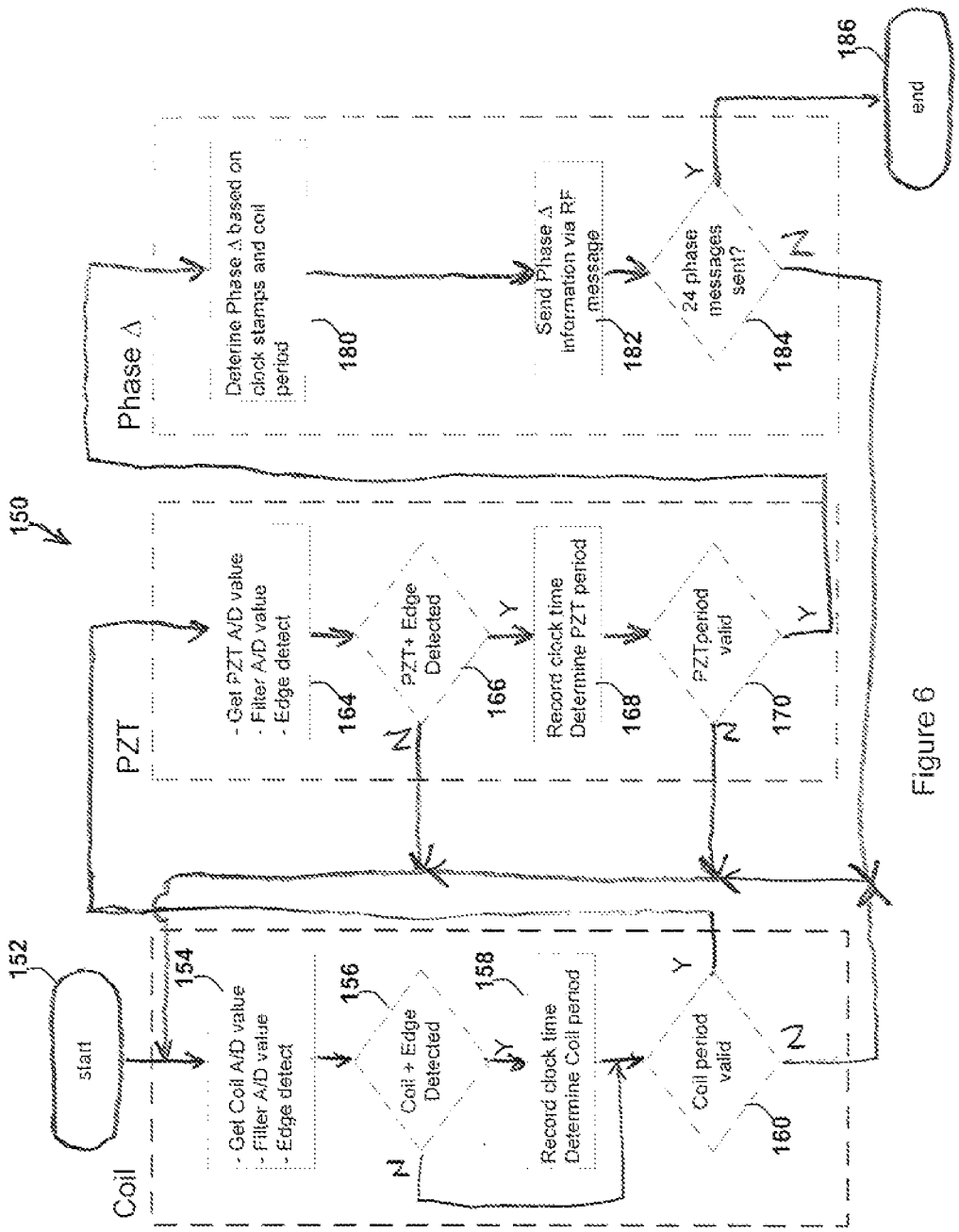
FIG. 6 is a flow chart depicting a control process used by the tire-based sensor unit in accordance with an example embodiment of the present invention.

Referring to FIG. 6, the control process 150 performed by the tire-based unit controller 62 for determining the phase difference value is shown. The process starts at step 152 where initial conditions, flags, appropriate values, etc., are set. At step 154, the value of the voltage induced across the coil 80 is measured, filtered and an edge value is determined In step 156, a determination is made whether a rising edge has just occurred, and if so, proceeds to step 158 that records the clock time and determines the period based on the previous rising coil clock time. If a rising coil edge had or hadn't occurred, flow will continue to step 160 which determines if the last coil period is valid. If the last coil period was not valid, the process loops back to step 154. In this manner, a valid coil period must be obtained prior to sampling of the PZT signal in step 164

At step 164, the value of the voltage output from the acceleration sensor 16 is measured, filtered and an edge value is determined In step 166, a determination is made whether a rising edge has just occurred on the acceleration signal, and if so, proceeds to step 168 which records the clock time and determines the period based on the previous rising acceleration clock time. If a rising edge has not just occurred in step 166, the process loops back to step 154. Once an acceleration period is determined in step 166 and clock time recorded and period determined in step 168, validity of the period is determined in 170. Validity is based on the speed range of the vehicle. If not valid, process loops back to step 154 until both a valid coil and acceleration period are obtained.

In step 180, a phase difference determination is made using the recorded clock times from the last coil and acceleration rising edges and the last coil period. Thus, the phase difference is always with respect to the coil signal (reference signal). After the phase difference is determined, the information is sent via a RF message to the vehicle based receiver 20 in step 182. Step 184 then checks if enough phase difference RF messages have been sent, and, if so, will proceed to the step 186 which ends the phase difference process. The process loops back to step 154 if all of the phase difference messages have not been sent.

Figure 7:
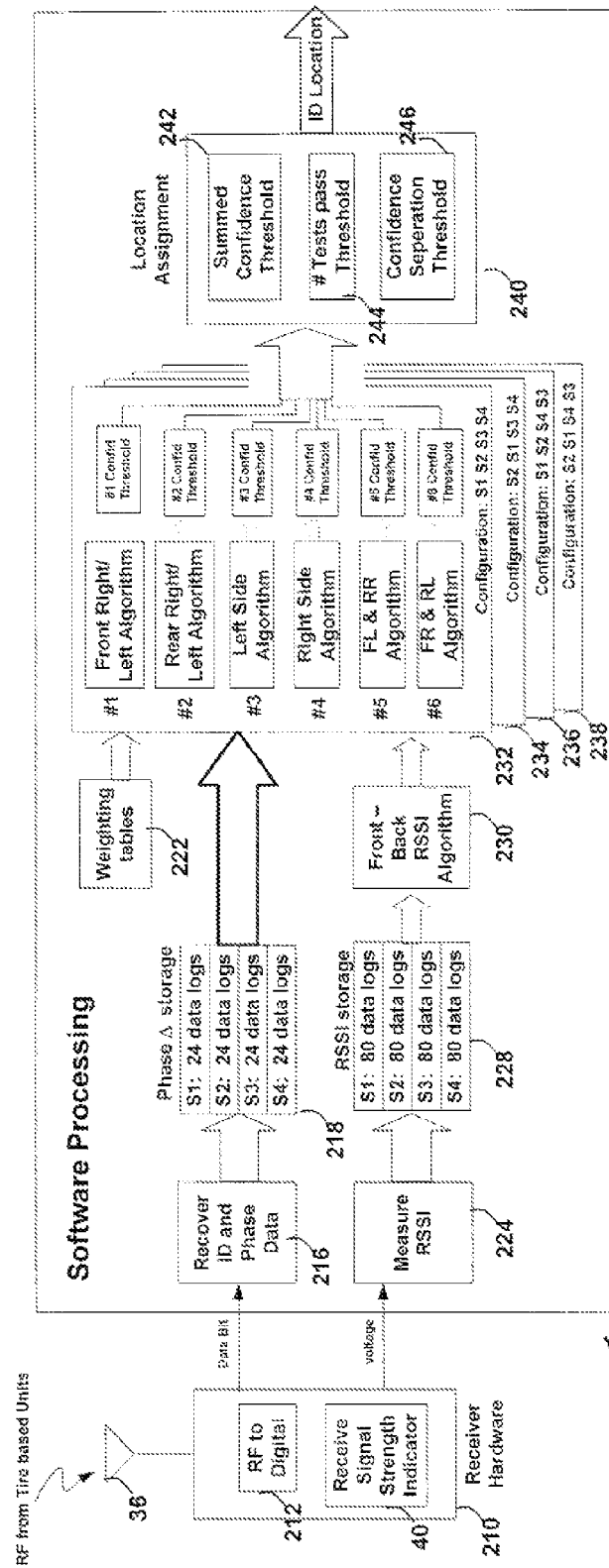
FIGS. 7 is a schematic block diagram of the vehicle-based receiver in accordance with an example embodiment of the present invention.

Referring FIG. 7, the operation of the vehicle-based receiver 20 will be better appreciated. The vehicle-based controller 20 may be a microcomputer programmed to execute a control process, including one or more algorithms. The functions performed by vehicle-based controller 20 may, however, be carried out by other digital and/or analog circuitry, including separate electrical or electronic components, which may be assembled on one or more circuit boards using discrete circuitry or fabricated as an ASIC.

Each tire-based unit 15 includes an associated sensor. For the purposes of explanation, the four tire-based units are designated herein as S1, S2, S3, and S4, each of which transmits associated, determined phase information (phase difference between the magnetic field sensor and the accelerometer) and associate tire condition information. The vehicle-based unit 20, using the phase information and associated determined signal strength information that it derives, correlates the sensors S1, S2, S3, and S4 with tire location FR, FL, RR, and RL on the vehicle. Since the tires could be changed, remounted, etc., the vehicle-based system 20 has to associate or correlate each of the tire-based sensor units S1, S2, S3, and S4 with a location on the vehicle, i.e., FR, FL, RR, or RL. There are four possible combinations of sensor/vehicle corner locations. Assuming that the front two sensors are designated as S1 and S2 and the rear two sensors are designated as S3 and S4, the four possible combinations of left and right sensors are:

| FR | FL | RR | RL |
|----|----|----|----|
| S1 | S2 | S3 | S4 |
| S2 | S1 | S3 | S4 |
| S1 | S2 | S4 | S3 |
| S2 | S1 | S4 | S3 |

The RF signals from the tire-based transmitters are received via the antenna 36 and a receiver circuit 210. The receiver circuit 210 includes the RSSI circuit 40 and a converter circuit 212 that converts the received RF tire signal (having phase difference information and tire condition information) into a digital format. The digital information is connected to a signal processing circuit 216 that monitors the digital RF signal and recovers sensor ID information (S1, S2, S3, or S4) and phase difference information, i.e., the phase difference between the magnetic sensor signal and the accelerometer signal for that sensor. The received phase difference information and sensor ID information is then stored in a phase storage memory 218. Since there are four sensors (one associated with each of the four tires), four received messages are stored in the phase storage memory 218.

The receiving circuit 210 also includes the RSSI receiving circuit 40 that is connected to a RSSI measuring circuit 224 that measures the signal strength of each of the received signals. The RSSI value for each of the signals from the four tire-based units 15 is stored in an RSSI storage memory 228. Since the receiving antenna 36 is positioned a different distance from the front and rear axles, the two signals from the tire-based units associated with the front axle will have a different RSSI value from the signals from the tire-based units associated with the rear axle. The controller 20 determines which two signals are from the front mounted tires and which two signals are from rear mounted tires in a RSSI algorithm 230. The controller of the vehicle-based receiver unit 20 then performs six phase confidence tests for each of the four possible sensor configurations, 232, 234, 236, and 238, using the stored phase information in the phase storage memory 218 and the RSSI information from the front/back determination function 230. The results of the pairs of sensor phase comparisons (4×6×24) are applied to a weighting table 222 in order to determine a confidence value for each comparison. Confidence values are added together giving six results, corresponding to the six tests, for each of the configurations 232, 234, 236, and 238.

Looking into details of 232 (234, 236, and 238 are similar), the six tests that are performed and the ideal expected outcome is listed below.

| Test # | Wheels | Sensors | Phase in Degrees |
|--------|--------|---------|------------------|
| 1 | FR-FL | S1-S2 | 130 |
| 2 | RR-RL | S3-S4 | 130 |
| 3 | RL-FL | S4-S2 | 0 |
| 4 | RR-FR | S3-S1 | 0 |
| 5 | FR-RL | S1-S4 | 130 |
| 6 | RR-FL | S3-S2 | 130 |

It is well understood that earth's magnetic field direction is dependent on the location. This is described as the magnetic field inclination angle. Since the angle of the peak magnetic field is used as the reference for accelerometer phase delay, the phase delay from a wheel will be dependent upon the geographic location of the vehicle. However, when compared to another tire, this dependency is removed. For example, if a left tire in Boston has a phase Δ of 100 deg and the right tire has a phase Δ of 230, the resultant difference is 130 deg. If the inclination angle changes by 50 degree due to location change, the same two tires would have angles of 150 and 280 deg respectively, and their difference would still be 130 degree. Thus, there is an expected 0 degree zero phase difference for front and rear sensors on the same side of the vehicle and a phase difference of 130 degrees for sensors on opposite sides of the vehicle (assuming ideal conditions), independent of global position. However, ideal conditions do not match reality. Also, if measurements are taken by the tire-based sensors at different driving directions, the expected phase difference between the magnetic sensor 18 (used as the zero point reference) and the accelerometer 16 may change depending on the inclination angle.

In the confidence tests shown in 232, for test #1, twenty four pairs of FR and FL phase Δ are subtracted. Each of the 24 results are compared against the weighting table 222 to obtain a confidence value for that pair comparison. The confidence values are stored as a predetermined table of values assigned to the phase subtraction result compared against the anticipated phase difference (0 degrees or 130 degrees). For example, if a measure phase difference is 160 degrees (instead of the expected 130 degrees), a weighted value of 2 may be assigned. If a measured phase difference is 130 degrees, a weighted value of 4 may be assigned. If a measured phase difference is 240 degrees (instead of the expected 130 degrees), a weighted value of −2 may be assigned. The twenty-four weighted values from test #1 are then added. It should be noted that the result of the 24 additions can be a positive or negative value, depending on how good or poor the data is. The result of the addition of the confidence values for test #1 is compared against a threshold, and if greater than the threshold, the test is considered to PASS. A similar process will occur for the other 5 test, and over all four configurations. The results of all 6 tests, confidence values, and whether the tests passed, for each of the four configurations 232, 234, 236, and 238, are used by Location Assignment logic 240 to correlate sensor/vehicle location.

The location assignment function, 240, has three separate criteria, 242, 244, and 246 that must be satisfied prior to assignment. Criteria 242 requires that a cumulative confidence value of all six tests within a configuration 232, 234, 236, or 238, exceed a Summed Confidence Threshold. Criteria 244 requires that a predetermined number of confidence tests must pass (confidence values greater than thresholds in 232, 234, 236, and 238). Lastly, Criteria 246 requires a predetermined confidence value separation between the configuration with the highest Summed Confidence Value, 242, and the next highest Summed Confidence Value configuration. If all three tests are satisfied, sensor ID/vehicle location correlation occurs.

By comparing all four tires sensor phase information (same axle, cross axle, and same side), a much more robust method is achieved as compared to a same axle comparison. For example, if one tire sensor S1 has erroneous information, there would be no way to make a decision on location between S1 and S2 (given they are on the same axle). By comparing S2 to S3 and S4, a high confidence can be established in locating the sensors S1, S2, S3 and S4.

Referring to FIG. 8, the auto-location learning process for the vehicle-based receiver 20 is shown. When the vehicle ignition is turned on in step 302, initial conditions, flags, appropriate values, etc., are set. In step 304, a determination is made as to whether all the sensors of the tire-based units 15 have completed sending sensed data and whether the storage buffers 218 and 228 have stored data from the four sensors. If the determination in step 304 is negative the process proceeds to step 306 where the vehicle-based unit 20 continues to receive sensor messages and measure RSSI values and then loops back to step 304. If the determination in step 304 is affirmative, the process proceeds to step 308 where a determination is made as to whether the RSSI values from the received sensor signals indicate a sufficient separation in values to decide front or rear sensor location. If the determination in step 308 is negative, the process proceeds to step 310 where the auto-location process is aborted. If the process is aborted in step 310, the previously stored sensor location correlation data is recalled in step 312 and the control process then switches into its normal tire pressure monitor mode in step 314 using the old tire-based sensor location values.

If the determination in step 308 is affirmative, the sensor location correlation for front and back sensors is determined in step 320 and sensor ID's are assigned to front and rear sensors in step 322. To then determine left and right location in addition to the already determined front and rear location, the process, in step 330, determines left and right locations using the confidence phase tests of function 240. As mentioned, the three tests are (1) number of passed tests, (2) confidence values greater than thresholds, and (3) sufficient confidence separation for a particular possible correlation as depicted in function 240. In step 332, a determination is made as to whether the sensor locations have been determined If the determination in step 332 is negative (the three tests of function 240 are not satisfied), the previous determined location correlation is reverted to in step 312. If the determination in step 332 is affirmative, new (if they in fact are different) sensor ID's (S1, S2, S3, and S4) are assigned (correlated) to the four vehicle corner locations (FL, FR, RL, and RR) in step 340. After the new sensor/location correlation is assigned in step 340, the process then switches to its normal tire pressure monitoring mode.

From the above description of the invention, those skilled in the art will perceive improvements, changes and modifications. Such improvements, changes, and/or modifications within the skill of the art are intended to be covered by the appended claims.

The invention claimed is:

1. An apparatus for determining a position of a tire on a vehicle comprising:
   a tire-based sensing unit, each tire on the vehicle having an associated tire-based sensing unit, each tire-based sensing unit including,
   a first sensor mounted for rotation with the tire and for generating a first sensor signal indicative of such rotation;
   a second sensor mounted for rotation with the tire and for generating a second sensor signal indicative of such rotation;
   a transmitter for transmitting a signal indicative of a phase relationship between the first and second sensor signals;
   axle position sensor for determining each tire-based sensing unit position relative to a front and rear axle of the vehicle and providing an axle position signal for each tire-based sensing unit; and
   a controller for monitoring the transmitted phase signals of each tire-based sensing unit and the determined axle position signals, said controller including,
   means for comparing the tire-based sensing unit phase relationships for possible tire locations considering the determined axle positions of the tire-based sensing units,
   means for determining a confidence value by weighting the compared phase relationships, means for comparing the phase difference of each tire-based sensing unit relative to the phase difference of other tire-based sensing units for each possible vehicle tire location, and means for associating each tire-based sensing unit with a vehicle location in response to the confidence values.

2. The apparatus of claim 1 wherein the first sensor is a gravitational sensor.

3. The apparatus of claim 2 wherein said gravitational sensor is an accelerometer.

4. The apparatus of claim 1 wherein the second sensor is a magnetic field sensor.

5. The apparatus of claim 4 wherein said magnetic field sensor includes a coil.

6. The apparatus of claim 1 further including a tire condition sensor for sensing condition of the tire and for transmitting a signal indicative of the sensed tire condition.

7. The apparatus of claim 1 further including receiver means for determining the received signal strength of the transmitted signals, where the receiver is closer to one of the axles, in order to determine the axle positions of the tire mounted sensors.

8. The apparatus of claim 1 further including low frequency initiation means located on or near one of the axles, in order to determine the axle positions of the tire mounted sensors.

9. A method for determining a position of a tire on a vehicle comprising the steps of:

sensing tire rotation by a first method and generating a first signal indicative of sensed rotation;

sensing tire rotation by a second method and generating a second signal indicative of sensed rotation;

transmitting a signal indicative of a phase relationship between the first and second signals;

measuring signal strength of the transmitted sensor signals; and monitoring via a controller the phase relationship of the transmitted signals, determining confidence value weights from the monitored phase relationships, monitoring the received signal strength of the transmitted signals, and correlating location of each tire-based sensing unit with vehicle location responsive to the confidence values.

* * * * *